(12) United States Patent
Powell et al.

(10) Patent No.: US 10,516,709 B2
(45) Date of Patent: Dec. 24, 2019

(54) FILES AUTOMATICALLY SHARED AT CONFERENCE INITIATION

(71) Applicant: Cisco Technology, Inc., San Jose, CA (US)

(72) Inventors: Brian Powell, El Segundo, CA (US); Jonathan Rosenberg, Freehold, NJ (US); Amit Barave, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 203 days.

(21) Appl. No.: 15/637,630

(22) Filed: Jun. 29, 2017

(65) Prior Publication Data

US 2019/0007467 A1 Jan. 3, 2019

(51) Int. Cl.
| | |
|---|---|
| H04L 29/06 | (2006.01) |
| H04L 12/18 | (2006.01) |
| G06Q 10/10 | (2012.01) |
| H04L 29/08 | (2006.01) |
| H04N 7/14 | (2006.01) |
| H04M 3/56 | (2006.01) |
| H04N 7/15 | (2006.01) |

(52) U.S. Cl.
CPC ....... *H04L 65/403* (2013.01); *G06Q 10/1095* (2013.01); *H04L 12/1822* (2013.01); *H04L 65/1093* (2013.01); *H04L 67/06* (2013.01); *H04L 67/32* (2013.01); *H04M 3/567* (2013.01); *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 4,460,807 | A | 7/1984 | Kerr et al. |
| 4,890,257 | A | 12/1989 | Anthias et al. |
| 4,977,605 | A | 12/1990 | Fardeau et al. |
| 5,293,430 | A | 3/1994 | Shiau et al. |

(Continued)

FOREIGN PATENT DOCUMENTS

| | | |
|---|---|---|
| CN | 101055561 | 10/2007 |
| CN | 101076060 | 11/2007 |

(Continued)

OTHER PUBLICATIONS

Choi, Jae Young, et al; "Towards an Automatic Face Indexing System for Actor-based Video Services in an IPTV Environment," IEEE Transactions on 56, No. 1 (2010): 147-155.

(Continued)

*Primary Examiner* — Alina A Boutah
(74) *Attorney, Agent, or Firm* — Polsinelli PC (57) ABSTRACT

The present technology automatically shares materials at the start of a videoconference without requiring a participant to find the materials or instruct the videoconferencing application to share the materials. The conference materials can be automatically shared without any conference participant involvement. The present technology automatically associates materials included in a calendar invitation to the conference or in a shared space referenced in the calendar invitation. These materials can be automatically shared when the conference launches.

15 Claims, 6 Drawing Sheets

(56) References Cited

U.S. PATENT DOCUMENTS

| | | |
|---|---|---|
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 * | 5/2015 | Thorsen ............... G10L 15/183 |
| | | 704/235 |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,203,875 B2 | 12/2015 | Huang et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 * | 11/2016 | Cole ...................... G06F 3/01 |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,716,861 B1 * | 7/2017 | Poel ...................... H04N 7/15 |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |

(56) References Cited

U.S. PATENT DOCUMENTS

| | | |
|---|---|---|
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1* | 4/2005 | Boyer .............. G06Q 10/10 455/463 |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0210351 A1* | 8/2009 | Bush .............. G06Q 10/109 705/80 |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1* | 1/2010 | Xiao .............. G06Q 10/10 709/204 |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264745 A1* | 10/2011 | Ferlitsch .............. G06Q 10/109 709/205 |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0269185 A1* | 10/2012 | Castleman .......... H04M 7/0027 370/352 |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |

(56) References Cited

U.S. PATENT DOCUMENTS

| | | |
|---|---|---|
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0070045 A1* | 3/2013 | Meek ............... G06Q 10/06 348/14.07 |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0358264 A1 | 12/2014 | Long et al. |
| 2014/0358613 A1* | 12/2014 | Libin ............... G06Q 10/1095 705/7.19 |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0088997 A1* | 3/2015 | van Dijk ............... G06Q 10/10 709/206 |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1* | 3/2016 | Priya ............... H04L 65/403 709/204 |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0321347 A1 | 11/2016 | Zhou et al. |
| 2016/0350134 A1* | 12/2016 | VerWeyst ............... G06F 16/93 |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0083871 A1* | 3/2017 | Chang ............... G06Q 10/1095 |
| 2017/0093874 A1 | 3/2017 | Uthe |
| 2017/0104961 A1 | 4/2017 | Pan et al. |
| 2017/0161258 A1* | 6/2017 | Astigarraga ........ G06F 17/2775 |
| 2017/0171260 A1 | 6/2017 | Jerrard-Dunne et al. |
| 2017/0324850 A1 | 11/2017 | Snyder et al. |
| 2018/0012192 A1* | 1/2018 | Rosenberg ............ H04L 65/403 |
| 2018/0018636 A1* | 1/2018 | Bisti ............... G06Q 10/063116 |
| 2018/0225635 A1* | 8/2018 | Holmes ............... G06Q 10/1095 |
| 2018/0268345 A1* | 9/2018 | Tolica ............... G06Q 10/063114 |
| 2018/0337963 A1 | 11/2018 | Faulkner ............... H04L 65/403 |
| 2018/0365654 A1* | 12/2018 | Carver ............... G06Q 10/1095 |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |

(56) References Cited

FOREIGN PATENT DOCUMENTS

| | | |
|---|---|---|
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| WO | WO 98/55903 | 12/1998 |
| WO | WO 2008/139269 | 11/2008 |
| WO | WO 2012/167262 | 12/2012 |
| WO | WO 2014/118736 | 8/2014 |

OTHER PUBLICATIONS

Cisco Systems, Inc. "Cisco webex: WebEx Meeting Center User Guide for Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.
Author Unknown, "A Primer on the H.323 Series Standard," Version 2.0, available at http://www.packetizer.com/voip/h323/papers/primer/, retrieved on Dec. 20, 2006, 17 pages.
Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (expert), http://www.iste.org/docs/excerpts/VIDCO2-excerpt.pdf (last accessed 1011-2013), 2009.
Epson, "BrightLink Pro Projector," BrightLink Pro Projector. http://www.epson.com/cgi-bin/Store/jsp/Landing/brightlink-pro-interactive-projectors.do?ref=van bightlink-pro—dated 2013 (last accessed 10-112013).
Infocus, "Mondopad," Mondopad. http://www.infocus.com/sites/default/files/InFocus-Mondopad-INF5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-board-datasheet.pdf, (last accessed Oct. 11, 2013).
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).

\* cited by examiner

FILES AUTOMATICALLY SHARED AT CONFERENCE INITIATION

TECHNICAL FIELD

The present disclosure pertains to automatically associating files with a conference and more specifically automatically presenting the files associated with the conference at the initiation of the conference.

BACKGROUND

Web conferences are now a common way for groups to meet to discuss the topic. However, despite the experience of many users in initiating or participating in web conferences, such conferences often start late because participants of the web conference need to locate and share files that facilitate discussion the topic of the web conference.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Significant time is wasted at the start of videoconferences by conference participants that don't plan ahead for their participation in the videoconference and find materials that would be beneficial to share or display during the video conference. Oftentimes these materials are distributed before the conference either in a calendar invitation to the conference or by saving the materials in a shared space (e.g., an accessible network directory or even a online group collaboration space such as a CISCO SPARK space, SLACK channel, etc.). Even when the materials are shared in advance, delays take place by conference participants needing to navigate to the materials and choosing to share them. Even the manipulation of the user interface of the videoconferencing software can cause delays for participants that are unfamiliar with the software.

The present technology automatically shares materials at the start of a videoconference without requiring a participant to take the above-described steps. In some embodiments, conference materials can be automatically shared without any conference participant involvement. In some embodiments, conference materials can be automatically shared after a conference participant accepts a prompt authorizing such sharing. In some embodiments, conference materials available for sharing are listed in a prominent user interface at the initiation of the conference, whereby a participant can select materials to be shared directly from the conference interface without requiring additional navigation to find the materials.

The present technology automatically associates materials included in a calendar invitation to the conference or in a shared space referenced in the calendar invitation. These materials can be automatically shared when the conference launches.

DETAILED DESCRIPTION

Figure 1A:
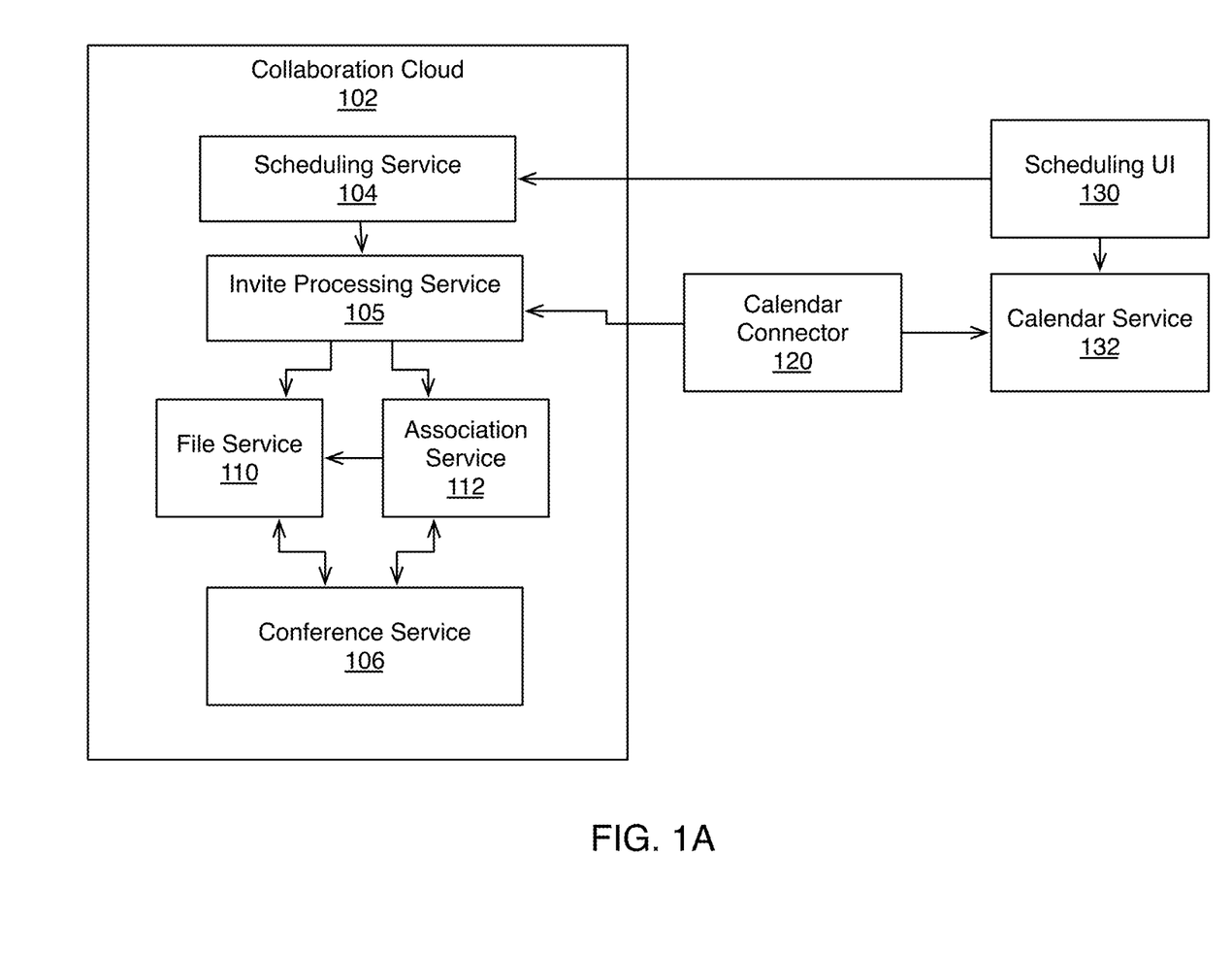
FIG. 1A is a conceptual block diagram illustrating an example environment for providing conferencing capabilities, in accordance with various embodiments of the subject technology.
Figure 2:
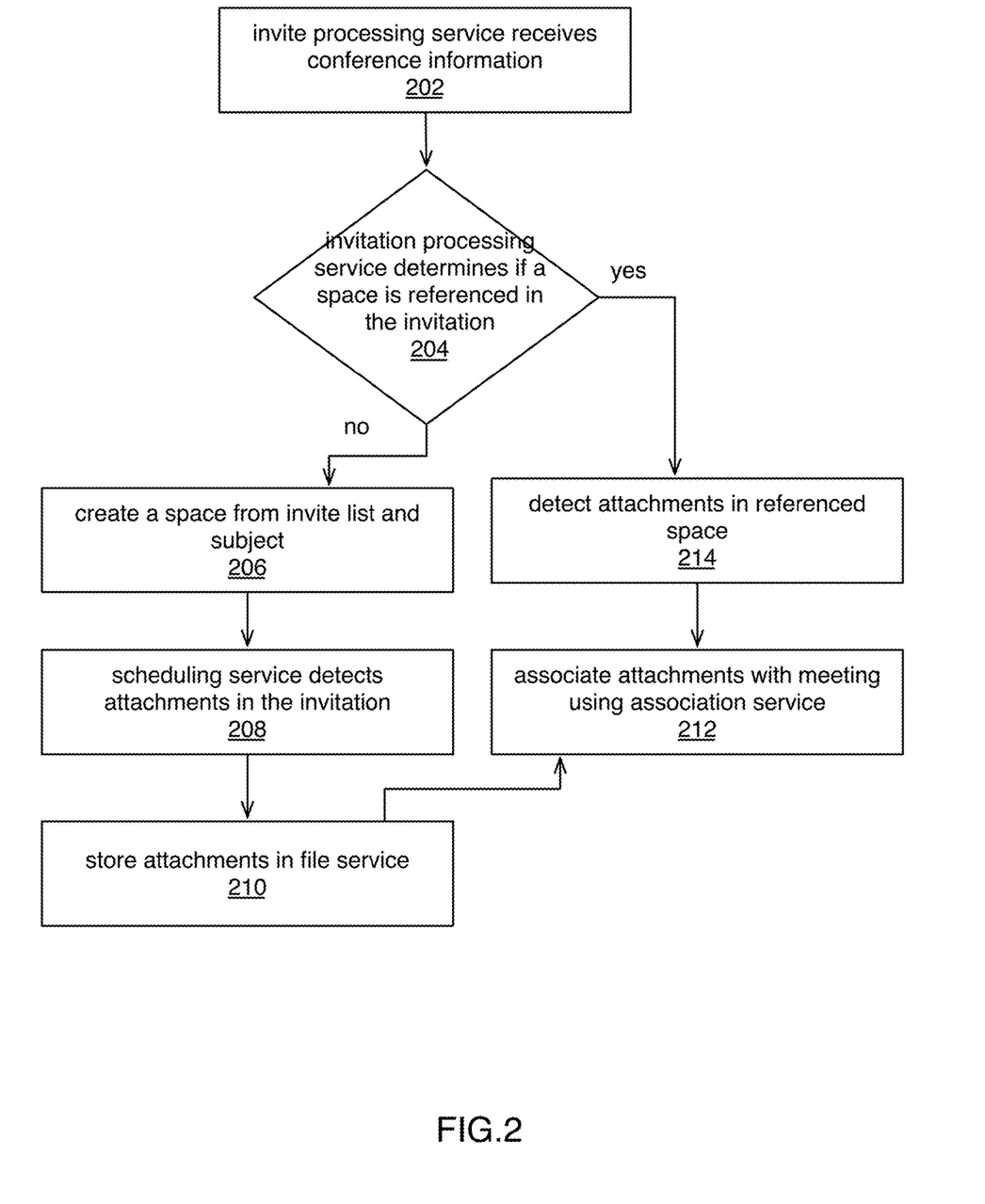
FIG. 2 is an example method of automatically associating materials with a conference in accordance with various embodiments.

FIG. 1A illustrates an example system of the present technology for automatically associating files with a conference and automatically presenting a file at initiation of the conference in accordance with the method illustrated in FIG. 2.

Collaboration cloud 102 includes a plurality of services useful for scheduling and hosting a conference. Collaboration cloud 102 includes a scheduling service 104 for scheduling conferences. Conferences can be scheduled with scheduling service 104 directly through scheduling user interface 130, or can be scheduled with scheduling service 104 indirectly through a calendar application (e.g. iCal, Outlook, etc.) on a users device where scheduling user interface 130 is a plugin or application offered by scheduling service 104 to schedule conferences using the interface provided by the calendar application. These calendar applications are often configured to interact with calendar service 132 (e.g., Exchange Server, Google Calendar, etc.).

In some embodiments the scheduling interface can include an option whether to enable auto sharing materials consistent with the disclosures herein.

Conferences can be scheduled when a user creates a conference invitation using scheduling UI 130 which receives at least a link obtained from scheduling service 104 to a videoconference space to be hosted by conference service 106. Conference invitations can also include one or more invitees to the conference, and can also include one or more files, or a link to a file service storing one or more files, pertinent to the conference. Conference invitations can also identify one or more physical rooms, such as conference rooms where at least one participant in the conference may attend the conference. The conference invitation can also reference an online group collaboration space (e.g. CISCO SPARK space, SLACK channel, etc.). The conference invitation can take the form of a calendar reminder stored at or shared by calendar service 132.

Figure 1B:
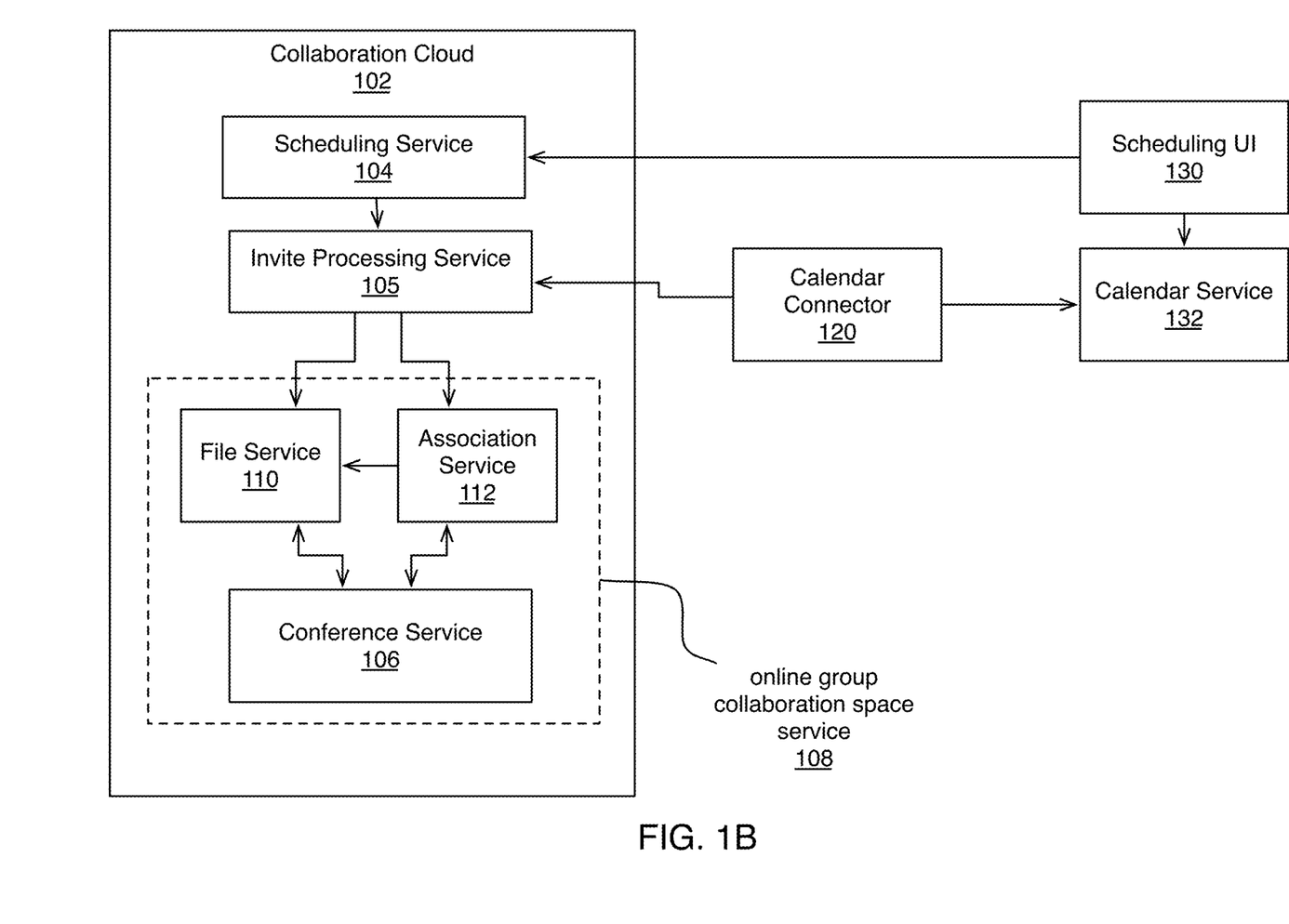
FIG. 1B is a conceptual block diagram illustrating an example environment for providing conferencing capabilities, in accordance with various embodiments of the subject technology.

FIG. 1B illustrates an embodiment of collaboration cloud 102, wherein file service 110, association service 112, and conference service 106 are all part of online group collaboration space service 108. It will be appreciated that any of file service 110, association service 112, or conference service 106 could be separate or part of online collaboration space service 110. Likewise online collaboration space service 108 can be part of or separate from collaboration cloud 102 that hosts conferences in accordance with the technology described herein.

Collaboration cloud 102 also includes invitation processing service 105. Invitation processing service 105 is configured to receive (202) a conference invitation and to detect whether any files are associated with the invitation.

In some embodiments conferences are scheduled using scheduling service 104 directly, and scheduling service 104 can pass conference information to invitation processing service 105. In some embodiments calendar service 132 is used to indirectly schedule the conference with scheduling service 104, and calendar connector 120 is configured to detect conferences relevant to collaboration cloud 102 in conference invitations stored at calendar service 132. Calendar connector 120 detects conferences relevant to collaboration cloud by monitoring calendar service 132 for calendar entries associated with a known user account that include a reference to a service hosted by collaboration cloud 102, such as a link to conferencing service 106. For example, the invitation to the conference can include a conference identifier that uniquely identifies the conference and that can be recognized by calendar connector 120.

Whether the conference is set up through scheduling service 104 or through calendar service 132, invitation processing service 105 receives (202) the conference invitation, or at least pertinent information therefrom, and associates any materials relevant to the conference with the conference so that the materials can be displayed at conference initiation. For example invitation processing service 105 can receive (202) an invitation to a conference and determine that it includes at least one material or a reference to materials accessible from a file service, or reference to an online group collaboration space service 108.

Invitation processing service 105 analyzes the conference invitation and determines (204) whether the invitation includes a reference to online group collaboration space service 108.

When invitation processing service 105 determines (204) that the invitation does not include a reference to an online group collaboration space, invitation processing service 105 can either store (210) any detected (208) materials in file service 110 and associate (212) the detected materials with the conference, or create (206) a space in online group collaboration service 108 to be associated (212) with the conference. The association (212) by the association service can include storing a link to a location at the file service (110) where the materials can be accessed during the conference.

In embodiments wherein invitation processing service 104 creates (206) a space in online group collaboration service 108 to be associated (212) with the conference, invitation processing service 105 can name the space from the subject of the conference invitation, and can associate invitees found in the invitation with the newly created space. Creating a space for the conference provides a collaborative space that can exist before and after the conference that will allow access to any materials associated with the conference, and can promote collaboration regarding the topic of the conference.

In some embodiments, invitation processing service 105 can query online collaboration service 108 to determine if a space already exists, but is not referenced in the invitation. For example, invitation processing service can request information regarding a collection of spaces to which the conference organizer or one of the invitees are already associated, and determine whether any of these spaces are pertinent to the subject of the conference using natural language processing techniques. In some embodiments, invitation processing service 105 can analyze materials accessible from the file service to determine if at least one materials or materials is present in any of the plurality of spaces, or to determine if the subject of at least one materials or materials matches the topic in any of the plurality of spaces, and determine if conference invitees in the conference invitation are assigned to the existing spaces having the materials is present or having a topic that matches the subject of the materials. When invitation processing service 105 determines that an existing space is pertinent to conference subject, invitation processing service 105 can use the existing space to associate with the conference and forego creating a new space.

When invitation processing service 105 determines (204) that the invitation includes a reference to an online group collaboration space, invitation processing service can communicate with the online group collaboration space service 108 by following a link to the online group collaboration service 108 (for example to file service 110) found in the invitation and detect (214) any materials in the referenced space. In some embodiments the online group collaboration space service 108 can include a collaborative workspace capable of exchanging messages, sharing materials, and in some instances, launch conferences from the collaboration space. Examples of such online group collaboration spaces can include CISCO SPARK and SLACK. In some embodiment the online group collaboration space can also be network accessible storage such as BOX, DROPBOX, or a directory on a shared network drive. When invitation processing service detects (214) materials in the referenced space, invitation processing service 105 notifies association service 112 of the existence of the materials. Association service 112 then associates (212) the materials to the scheduled conference.

In some embodiments there might be multiple materials in the conference invitation or associated with a referenced space. In such embodiments, invitation processing service can analyze the multiple materials to determine which materials is the most relevant to the scheduled conference. The most relevant materials can be considered the materials that should be displayed first when the conference initiations. In such embodiments, invitation processing service 105 can determine that a particular material is the most relevant if it is a presentation file type, or if it includes and agenda, or is the most recently created. Invitation processing service 105 can weight the materials and select the particular material that is most relevant, and this information can be recorded by association service 112.

Figure 3:
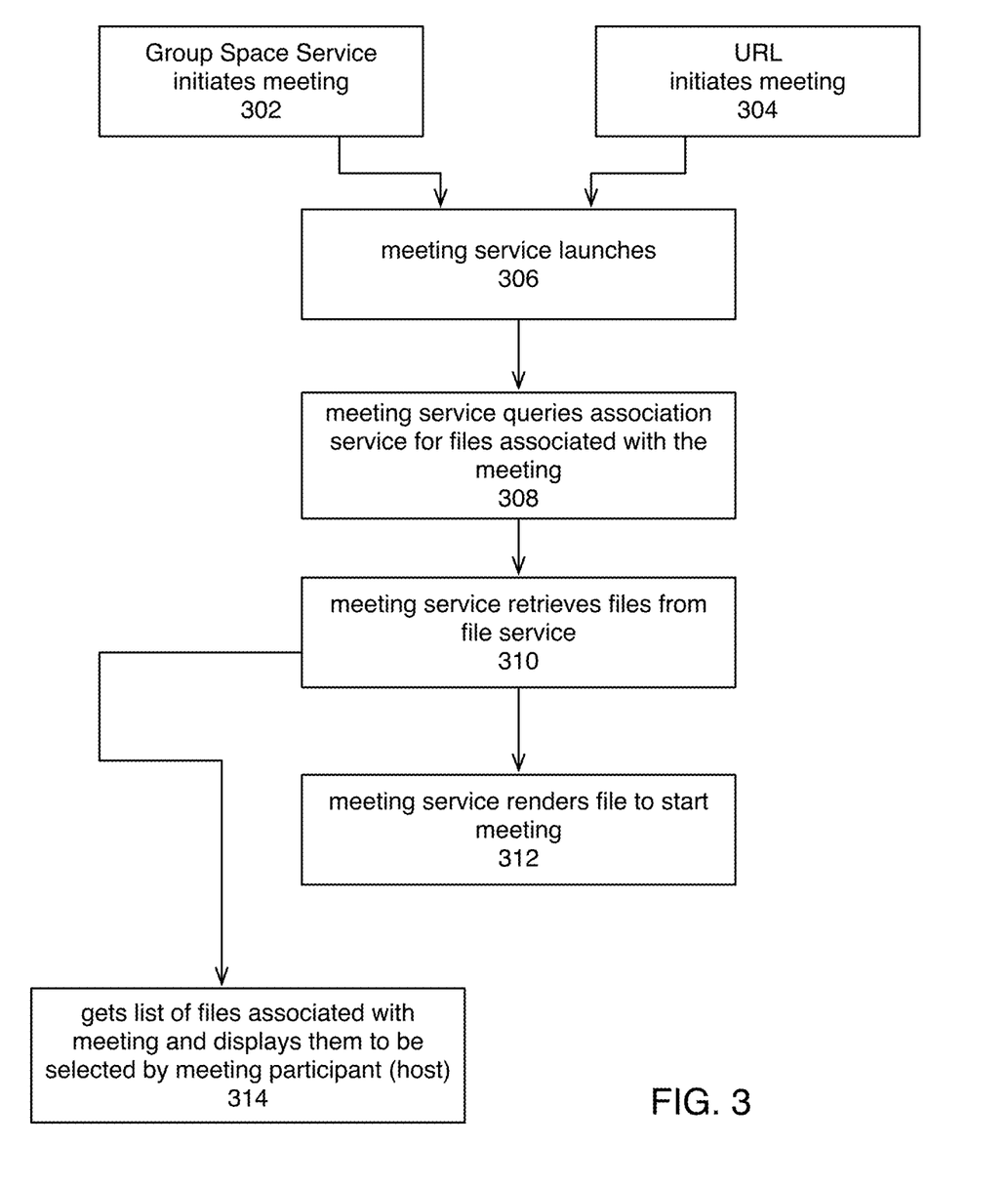
FIG. 3 is an example method of automatically displaying an associated materials at the time of launching a conference in accordance with various embodiments.

FIG. 3 illustrates an example method for starting a scheduled conference and automatically displaying files or materials pertinent to the conference. Whether a request to launch the scheduled conference at conference service 106 comes from online group collaboration space service 108 (302) or from a URL (304) found in a calendar invitation, conference service 106 receives a request to launch the scheduled conference and launches (306) the conference.

Conference service 106 queries (308) association service 112 for files associated with the conference, and retrieves (310) the files from file service 110. In some embodiments a list of the files that are associated with the conference are presented (314) at the initiation of the conference to be selected by one of the conference participants or host. In such embodiments, the conference experience is improved because conference participants do not need to search for a file and share the file. Instead the file available directly from the conference interface and can be automatically shared once selected.

In some embodiments, materials that were indicated to be the most relevant to start the conference can automatically presented (312) without first giving conference participants the option to select other files. Though, in some embodiments a confirmatory prompt might be provided. As addressed above, relevance can be determined based on weighting factors including when a file says agenda, or is a presentation, or is the most recently created file. In some embodiments, the most relevant file can also be indicated in a conference invitation or indicated to the scheduling service during scheduling.

In some embodiments, conference service 106 can select a file to associate with the conference to display (312) at random. Even if a non-optimal file is selected, this will still be an improvement a conference experience over waiting for a participant to find a file to display which often delays the start of the conference.

Files can be displayed during a conference by a document rendering service (not shown). The document rendering service can be an application on a client computer of a participant, likely the host, of the conference, or can be application associated with conferencing service 106 or online group collaboration space service 108. The document rendering service may render an original document, or a version that was converted to images, video or another format, such that it can be rendered for display in a videoconference.

Figure 4A:
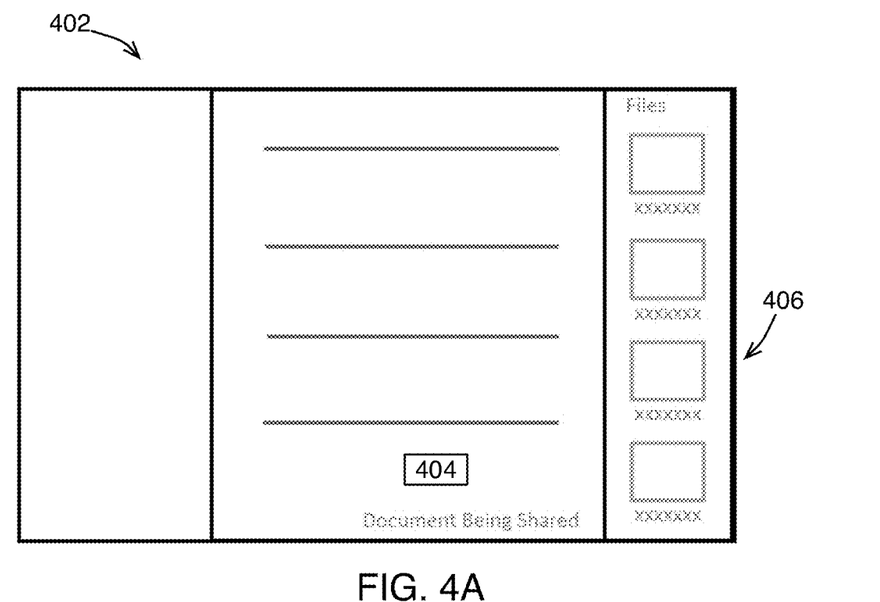
FIG. 4A and FIG. 4B illustrate example graphical user interfaces according to some embodiments.
Figure 4B:
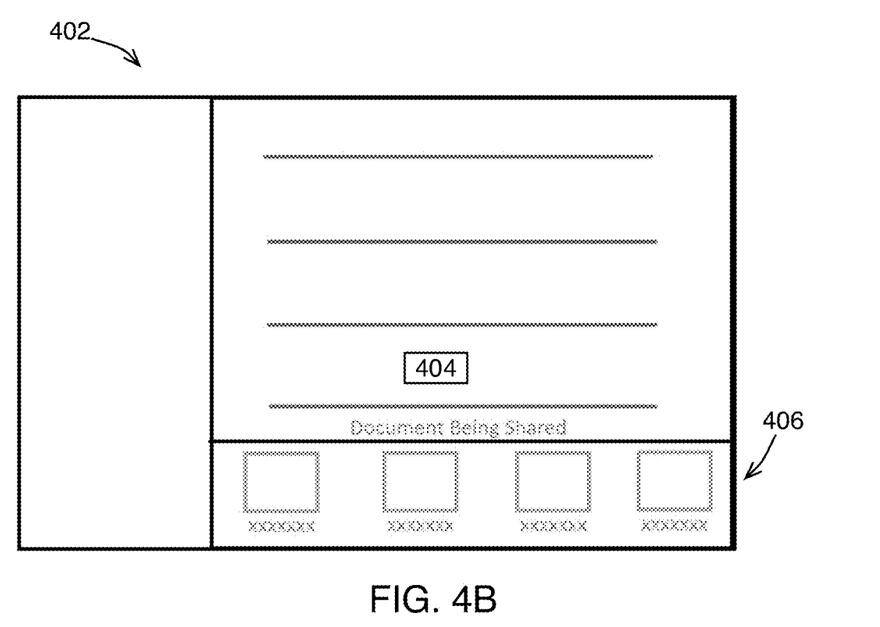

FIG. 4A and FIG. 4B illustrate example user interfaces 402 of a videoconference with automatically shared materials 404. FIGS. 4A and 4B also illustrates a panel of additional materials to associated with the conference that are available to be shared. To share a document in panel 406, a conference participant can select one of the represented material to quickly render the material and swap placed with the material being shared 404.

Figure 5:
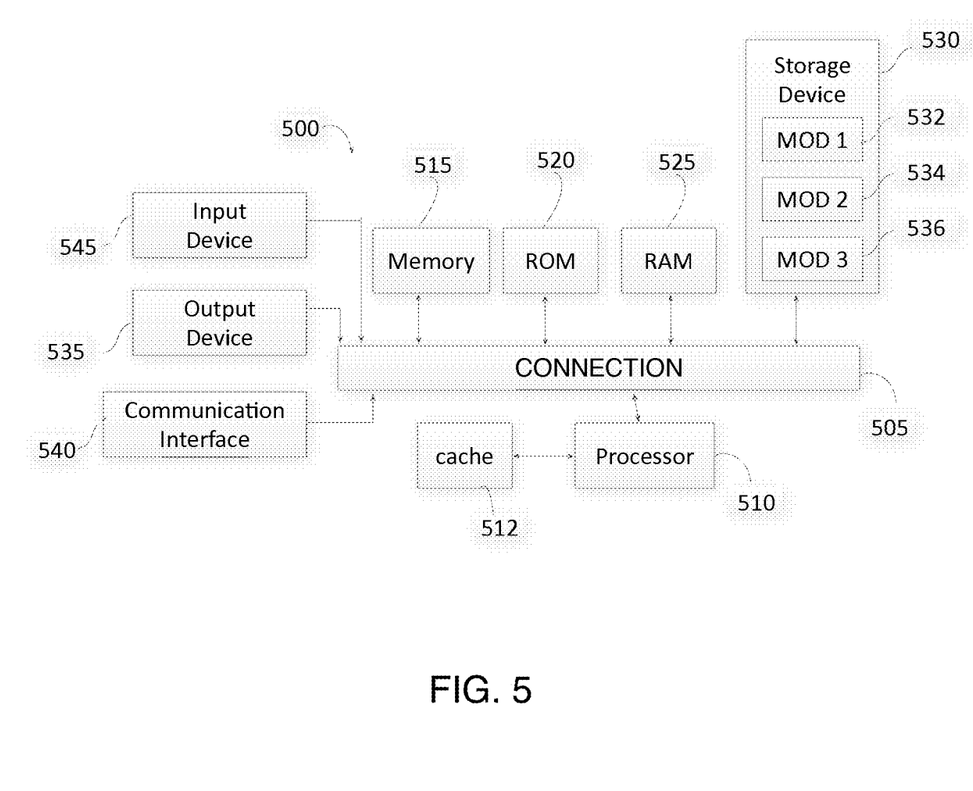
FIG. 5 shows an example possible system embodiment.

FIG. 5 shows an example of computing system 500 in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
 receiving an invitation to a conference at a conference invitation processing service, the invitation to the conference including a plurality of materials and/or a references to a materials accessible from a file service;
 detecting, by the invitation processing service, the plurality of materials and/or the references to the materials accessible from the file service; associating, by an association service, the plurality of materials to a scheduled conference;
 receiving a request to launch the scheduled conference;
 determining a most relevant material of the materials that is most relevant to the scheduled conference, wherein determining the most relevant material comprises determining when a material includes a heading that indicates an agenda for the conference, or the material is a presentation;
 after receiving the request to launch the scheduled conference, automatically rendering the most relevant material in the scheduled conference by a document rendering service.

2. The method of claim 1 comprising: detecting the invitation to the scheduled conference by a calendar connector, prior to the receiving the invitation to the conference at the conference invitation processing service, wherein the calendar connector monitors a calendar service for calendar items referencing the conference service; and sending the invitation to the conference invitation processing service.

3. The method of claim 1 wherein the invitation to the conference includes a meeting identifier that uniquely identifies the conference.

4. The method of claim 1 comprising: when the plurality of materials and/or the references to the materials is detected, sending the plurality of materials to a file service, and the association by the association service associates the material stored in the file service to the scheduled conference.

5. The method of claim 1, wherein the association by the association service includes storing a link to a location at the file service where the material can be accessed during the conference.

6. The method of claim 5, comprising: after receiving a request to launch the scheduled conference, determining by the association service whether the material is associated to the scheduled conference and is stored in the file service.

7. The method of claim 1, wherein the scheduled conference is hosted within a collaboration space service that includes a plurality of spaces, each space being assigned to a plurality of participants and having a topic.

8. The method of claim 7, wherein the invitation to the conference does not identify an existing space of the collaborative space service, the method comprising: creating a new space within the collaboration space service by assigning the service to invitees listed in the invitation, and using a title of the conference in the invitation as the topic of the space.

9. The method of claim 7, wherein the invitation to the conference does not identify an existing space of the collaborative space service, the method comprising: analyze the plurality of materials accessible from the file service to determine if the plurality of materials is present in any of the plurality of spaces, or to determine if the subject of any of the plurality of materials matches the topic in any of the plurality of spaces, and determine if conference invitees in the conference invitation are assigned to the existing spaces having the any of the plurality of materials present or having a topic that matches the subject of the any of the plurality of materials.

10. A non-transitory computer-readable medium comprising instructions stored thereon that when executed processor are effective to cause a computing system to:
 receive an invitation to a conference, the invitation to the conference including a plurality of materials and/or a-references to a materials accessible from a file service;
 detect the plurality of materials and/or the references to the materials accessible from the file service;
 associate the plurality of materials to a scheduled conference; receive a request to launch the scheduled conference;
 determine a most relevant material of the materials that is most relevant to the scheduled conference, wherein the most relevant material comprises determining when a material includes a heading that indicates an agenda for the conference, or the material is a presentation;

after receiving the request to launch the scheduled conference, automatically render the at most relevant material in the scheduled conference by a document rendering service.

11. The non-transitory computer-readable medium of claim 10 wherein the instructions are effective to cause the computing system to: when the plurality of materials and/or the references to the materials is detected, send the plurality of materials to a file service, and the association associates the material stored in the file service to the scheduled conference.

12. The non-transitory computer-readable medium of claim 10 wherein the associate includes storing a link to a location at the file service where the material can be accessed during the conference.

13. A system comprising: at least one processor; and
at least one non-transitory computer readable medium configured to store instructions executable by the at least one processor, the instructions effective to:
receive an invitation to a conference, the invitation to the conference including a plurality of materials and/or a-references to a materials accessible from a file service;
detect the plurality of materials and/or the references to the materials accessible from the file service;
associate the plurality of materials to a scheduled conference;
receive a request to launch the scheduled conference;
determine a most relevant material of the materials that is most relevant to the scheduled conference, wherein the most relevant material comprises determining when a material includes a heading that indicates an agenda for the conference, or the material is a presentation;
after receiving the request to launch the scheduled conference, automatically render the most relevant material in the scheduled conference by a document rendering service.

14. The system of claim 13 wherein the instructions are effective to: when the plurality of materials and/or the references to the materials is detected, send the plurality of materials to a file service, and the associate associates the material stored in the file service to the scheduled conference.

15. The system of claim 13 wherein the associate includes storing a link to a location at the file service where the material can be accessed during the conference.

* * * * *